United States Patent
Lee et al.

(10) Patent No.: US 8,760,468 B2
(45) Date of Patent: Jun. 24, 2014

(54) IMAGE PROCESSING APPARATUS AND IMAGE PROCESSING METHOD

(75) Inventors: Jae-jun Lee, Suwon-si (KR); Seong-sin Joo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 12/477,181

(22) Filed: Jun. 3, 2009

(65) Prior Publication Data

US 2010/0097396 A1    Apr. 22, 2010

(30) Foreign Application Priority Data

Oct. 17, 2008   (KR) .................. 10-2008-0101914

(51) Int. Cl.
*G09G 5/00* (2006.01)
*G09G 3/20* (2006.01)
*G06K 9/46* (2006.01)
*H04N 9/80* (2006.01)
*G06F 15/16* (2006.01)

(52) U.S. Cl.
USPC ............. 345/629; 348/51; 382/240; 386/248; 709/219

(58) Field of Classification Search
None
See application file for complete search history.

(56) References Cited

U.S. PATENT DOCUMENTS

| 7,321,367 B2 * | 1/2008 | Isakovic et al. ............... 345/502 |
| 2002/0051581 A1 | 5/2002 | Takeneuchi et al. |
| 2005/0165911 A1 | 7/2005 | Homiller |
| 2006/0209183 A1 * | 9/2006 | Mashitani et al. ............. 348/51 |
| 2006/0233247 A1 | 10/2006 | Visharam et al. |
| 2007/0058933 A1 | 3/2007 | Kobayashi et al. |
| 2008/0250470 A1 | 10/2008 | Bruls et al. |
| 2009/0028247 A1 * | 1/2009 | Suh et al. .................. 375/240.25 |
| 2009/0228466 A1 | 9/2009 | Peters et al. |

FOREIGN PATENT DOCUMENTS

| KR | 10-2007-0047301 A | 5/2007 |
| KR | 10-2008-0050471 A | 6/2008 |
| WO | 01/11874 A1 | 2/2001 |

OTHER PUBLICATIONS

Ziegler M. et al.: "Evolution of stereoscopic and three-dimensional video", Signal Processing. Image Communication, Elsevier Science Publishers, Amsterdam, NL, vol. 14, No. 1-2, Nov. 6, 1998, pp. 173-194, XP027357226, ISSN: 0923-5965.
Search Report dated May 16, 2011 from the European Patent Office in counterpart European application No. 09164354.4.
Communication dated Jan. 19, 2012 from the European Patent Office in counterpart European application No. 09164354.4.
Communication dated Mar. 11, 2013, issued by the European Patent Office in counterpart European Patent Application No. 09164354.4.
Communication dated Oct. 17, 2013 issued by the European Patent Office in counterpart European Patent Application No. 09 164 354.4.

* cited by examiner

*Primary Examiner* — Xiao Wu
*Assistant Examiner* — Matthew D Salvucci
(74) *Attorney, Agent, or Firm* — Sughrue Mion, PLLC

(57) ABSTRACT

An image processing apparatus and an image processing method are provided. The image processing apparatus includes: a first receiving unit which receives a first image data and an auxiliary information for receiving a second image data forming an improved image in cooperation with the first image data; a second receiving unit which receives the second image data; an image processing unit which generates an image; and a controller which controls the second receiving unit to receive the second image data based on the auxiliary information and controls the image processing unit to generate the improved image based on the first image data and the second image data.

14 Claims, 4 Drawing Sheets

IMAGE PROCESSING APPARATUS AND IMAGE PROCESSING METHOD

CROSS-REFERENCE TO RELATED APPLICATION

This application claims priority from Korean Patent Application No. 10-2008-0101914, filed on Oct. 17, 2008 in the Korean Intellectual Property Office, the disclosure of which is incorporated herein by reference.

BACKGROUND OF INVENTION

1. Field of Invention

Apparatuses and methods consistent with the present invention relate to an image processing apparatus and an image processing method which can generate a two-dimensional or three-dimensional image having high resolution using a conventional data transmission system.

2. Description of Related Art

An image processing apparatus such as a television and a set top box receives an image signal and processes the image signal to output image and audio. Recently, an image processing apparatus which can process a digital broadcast signal received from a digital broadcast system to output image and audio has been developed.

Such an image processing apparatus includes a demultiplexer which receives a transport stream (TS) and demultiplexes a video/audio elementary stream (ES); a memory which stores a transmission packet of a television program; a video decoder and an audio decoder which decode the video/audio signals outputted from the demultiplexer; a display unit and a speaker which reproduces signals outputted from the video decoder and the audio decoder; and a controller which controls the respective components.

The demultiplexer extracts electronic program guide (EPG) data and auxiliary information from the received transmission packet for transmission to a position which the controller can access.

The controller analyzes the extracted EPG data and auxiliary information and generates a graphical user interface (GUI).

The memory temporarily stores the extracted EPG data and auxiliary information and stores the GUI generated by the controller.

A user may select and view a desired program using the EPG data and the auxiliary information when the user wants to view a specific program or programs to be broadcast for a specific period of time.

However, such a conventional image processing apparatus can only process data having a limited capacity, and thus, cannot meet user's requirements for more detailed data or other services.

SUMMARY OF INVENTION

Accordingly, it is an aspect of the present invention to provide an image processing apparatus and an image processing method which can generate a two-dimensional or three-dimensional image having high resolution using a conventional data transmission system.

Additional aspects of the present invention will be set forth in part in the description which follows and, in part, will be obvious from the description, or may be learned by practice of the present invention.

The foregoing and/or other aspects of the present invention can be achieved by providing an image processing apparatus, including: a first receiving unit which receives a first image data and an auxiliary information for receiving a second image data forming an improved image in cooperation with the first image data; a second receiving unit which receives the second image data; an image processing unit which generates an image; and a controller which controls the second receiving unit to receive the second image data based on the auxiliary information and controls the image processing unit to generate the improved image based on the first image data and the second image data.

The second receiving unit may be connected to a server of a network.

The improved image may have relatively high resolution compared with an image by the first image data. In this respect, the first image data may be a broadcast signal transmitted by a digital TV system. Thus, it is possible generate an improved image having relatively high resolution using a conventional digital TV system.

The improved image may be a three-dimensional image. Thus, it is possible generate an improved image having relatively high resolution using a conventional two-dimensional image signal transmission system.

Here, the first image data may be two-dimensional image data; and the second image data may be auxiliary image data for forming the improved image into a three-dimensional image.

The improved image may be a three-dimensional image; and the first image data and the second image data may be respectively left-eye image data and right-eye image data which form the three-dimensional image.

The auxiliary information may include URL information of the server. Thus, the controller may connect the second receiving unit to a server in which the second image data is stored using the URL information.

The apparatus may further include a display unit which displays the image generated by the image processing unit, to display the image generated by the image processing unit.

The apparatus may further include a user selection unit through which the image by the first image data and the improved image are selected. Thus, a user may selectively display an image by the first image data transmitted from a conventional transmission system and the improved image generated based on the first and second image data.

The image processing unit may include: a demultiplexer which demultiplexes the first image data and the second image data; a synchronizer which synchronizes the first image data and the second image data; and a decoder which decodes the demultiplexed and synchronized first image data and second image data.

The synchronizer may synchronize the first image data and the second image data based on time information of the first image data, and time information of the second image data or a timestamp value of a real time transmission protocol.

The foregoing and/or other aspects of the present invention can be also achieved by providing an image processing method, including: receiving a first image data and an auxiliary information for receiving a second image data forming an improved image in cooperation with the first image data; receiving the second image data based on the auxiliary information; and generating the improved image based on the first image data and the second image data.

The second image data may be received from a server of a network.

The improved image may have relatively high resolution compared with an image by the first image data. In this respect, the first image data may be a broadcast signal transmitted by a digital TV system. Thus, it is possible generate an improved image having relatively high resolution using a conventional digital TV system.

The improved image may be a three-dimensional image. Thus, it is possible generate an improved image having relatively high resolution using a conventional two-dimensional image signal transmission system.

The first image data may be two-dimensional image data; and the second image data may be auxiliary image data for forming the improved image into a three-dimensional image.

The improved image may be the three-dimensional image; and the first image data and the second image data may be respectively left-eye image data and right-eye image data forming the three-dimensional image.

The auxiliary information may include URL information of the server. Thus, the controller may connect the second receiving unit to a server in which the second image data is stored using the URL information.

The method may further include displaying the generated improved image.

The method may further include selecting at least one of the image by the first image data and the improved image. Thus, a user may selectively display an image by the first image data transmitted from a conventional transmission system and the improved image generated based on the first and second image data.

The generating the improved image may include: demultiplexing the first image data and the second image data; synchronizing the first image data and the second image data; and decoding the demultiplexed and synchronized first image data and second image data.

The synchronizing may include synchronizing the first image data and the second image data based on time information of the first image data, and time information of the second image data or a timestamp value of a real time transmission protocol.

BRIEF DESCRIPTION OF DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
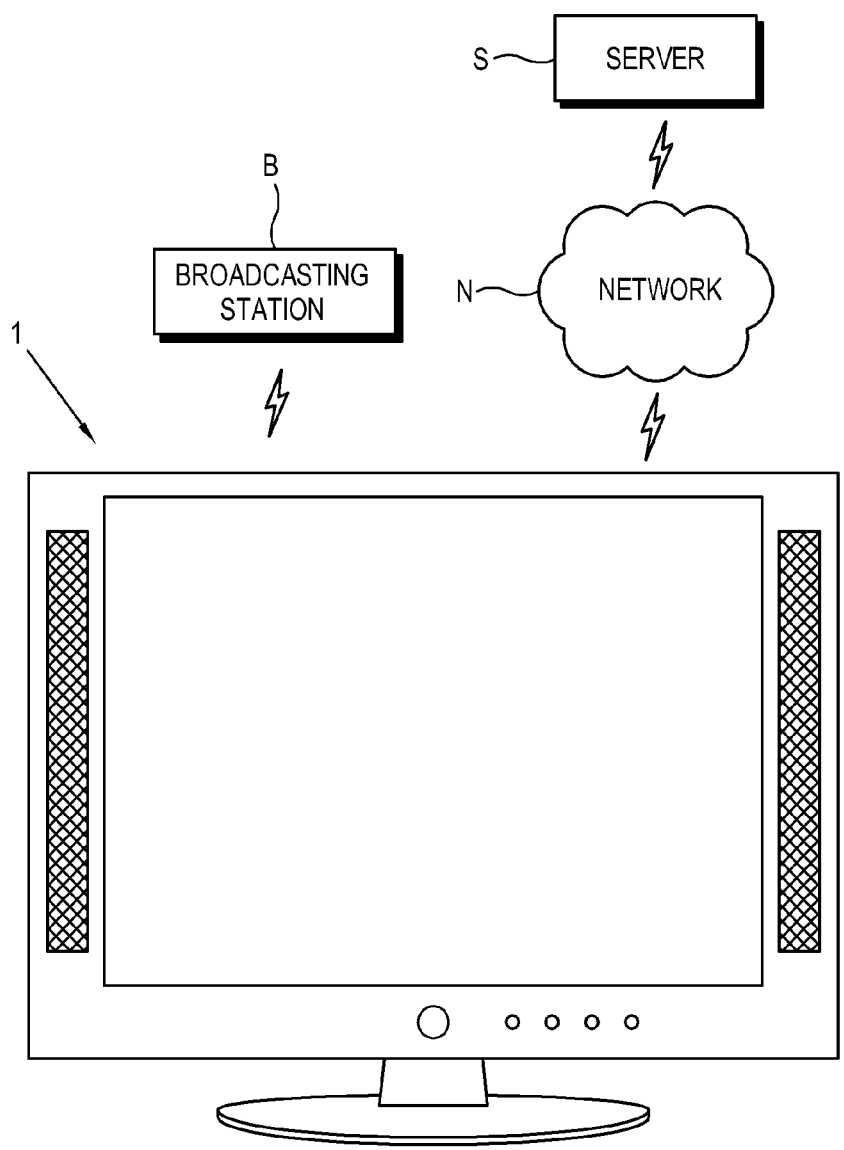
FIG. 1 is a diagram illustrating a configuration of an image processing apparatus according to an exemplary embodiment of the present invention.

Reference will now be made in detail to exemplary embodiments of the present invention, which are illustrated in the accompanying drawings, wherein like reference numerals refer to like elements throughout. The exemplary embodiments are described below so as to explain the present invention by referring to the figures. Redundant description of the exemplary embodiments may be omitted for simplicity of description.

Figure 2:
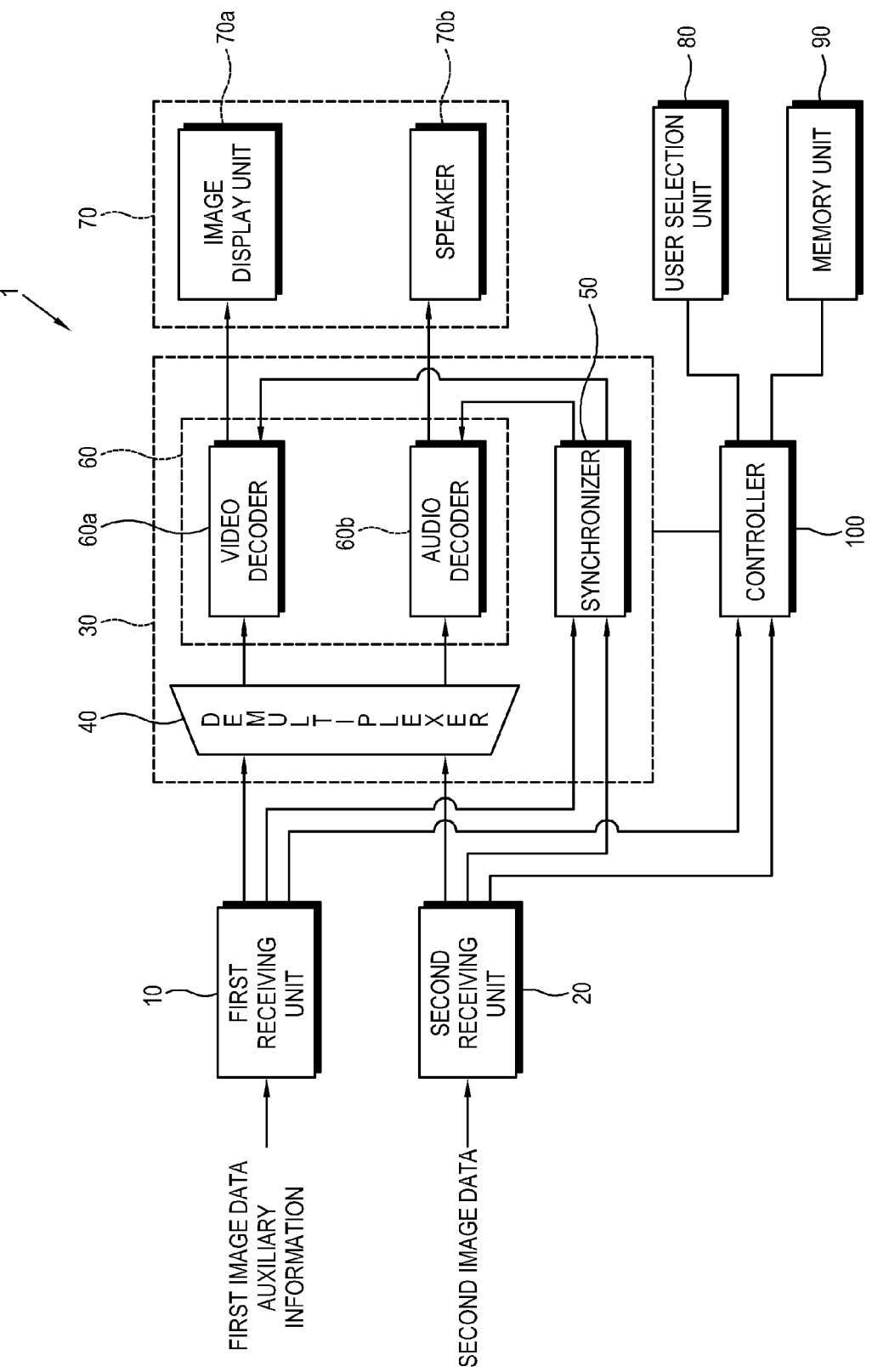
FIG. 2 is a block diagram illustrating an image processing apparatus according to an exemplary embodiment of the present invention.

As shown in FIGS. 1 and 2, an image processing apparatus 1 according to an exemplary embodiment of the present invention includes a first receiving unit 10 which receives first image data and auxiliary information for receiving second image data; a second receiving unit 20 which is connected to a server (S) of a network (N); an image processing unit 30 which generates an image; and a controller 100 which controls the second receiving unit 20 to receive the second image data on the basis of the auxiliary information and controls the image processing unit 30 to generate an improved image on the basis of the first image data and the second image data. The image processing apparatus 1 may be embodied as a television, a set top box for a television or a television receiving card for a computer system.

The first receiving unit 10 receives the first image data from a broadcasting station, a content provider or a recording medium such as a DVD. The first image data includes various image signals such as an analog TV signal, a digital TV signal, data of a package media and an image signal recorded in a recording medium such as a DVD or a memory. The first image data further includes time information such as a program clock reference (PCR), a presentation timestamp (PTS) or a decoding timestamp (DTS). Further, the first receiving unit 10 may include a memory (not shown) which stores the received first image data.

Hereinafter, the case that the first image data is a transport stream transmitted from a broadcasting station (B) will be described as an exemplary embodiment of the present invention. However, it is noted that the present invention is not limited thereto.

The second image data is data for forming an improved image in cooperation with the first image data. The second image data may have a format of 'a user diagram protocol (UDP)/a real time transport protocol (RTP)/non transport stream (TS) data', or may have a format of a 'UDP/RTP/TS data'. As described later, a synchronizing method and a matching method of the second image data corresponding to the first image data may be changed according to the format of the second image data.

The second image data may be variously set according to types of the first image data and the improved image. For example, in the case that the improved image has higher resolution than an image of the first image data, the first image data may be a basic resolution image data and the second image may be a high resolution image data.

For example, in the case that the improved image is a ultra high quality image having ultra high resolution 1920*1080P or more, the first image data is a high quality image signal having high resolution 1920*1080i or less which is a broadcast signal transmitted by a conventional DTV system; and the second image data is the auxiliary image data for forming the improved image in cooperation with the first image data. In this respect, it is noted that the resolution of the first image data is not limited to the above-mentioned value.

Similarly, the resolution of the improved image is not limited to the above-mentioned value and may have a resolution of 2048*1080, 3840*2160, 4096*2160, 7680*4320, 8192*4320 or more according to the types of the first image data and the second image data.

On the other hand, in the case that the improved image is a three-dimensional image, the first image data may be a two-dimensional image data, and the second image data may be the auxiliary image data for forming the improved image into the three-dimensional image. The second image data may be depth image data, disparity image data, stereo image information, multi view image information, or the like.

In the case that the improved image is the three-dimensional image, the first image data may be left-eye image data and the second image data may be right-eye image data. Alternatively, the first image data may be right-eye image data and the second data may be left-eye image data. In this respect, the first image data may form the two-dimensional image.

The auxiliary information for receiving the second image data is included in data received by the first receiving unit 10. The auxiliary information includes the type of the improved image, that is, image information informing whether that the improved image is the ultra high quality image or the three-dimensional image, and URL information that is an address of a server in which the second image data is stored. Further, the auxiliary information may include an electronic program guide (EPG) of the first image data and the improved image, and detailed information about the first image data and the improved image.

The second receiving unit 20 is connected to the server (S) through the network (N). The controller 100 connects the second receiving unit 20 to the server in which the second image data is stored, using the type of the improved image and the URL information received through the first receiving unit 10, to receive the second image data.

The second receiving unit 20 is connected to the server (S) for providing various data and/or contents through the network (N). To this end, the second receiving unit 20 may include a wired or wireless communication module (not shown). Further, the second receiving unit 20 may include a memory (not shown) for storing the second image data received from the server.

In the exemplary embodiment of the present invention, it is illustrated that the first receiving unit 10 is connected to the content provider or the broadcasting station to receive the first image data and the auxiliary information; and the second receiving unit 20 is connected to the server (S) through the network (N) to receive the second image data. However, it is noted that the present invention is not limited thereto and the first receiving unit 10 and the second receiving unit 20 may be provided in a different way. For example, the first receiving unit 10 and the second receiving unit 20 may receive respective data through different channels. Further, the first receiving unit 10 may be connected to a terrestrial or a cable to receive the first image data and the auxiliary information; and the second receiving unit 20 may be connected to a satellite to receive the second image data.

The controller 100 controls the second receiving unit 20 to receive the second image data from the server (S) based on the auxiliary information received through the first receiving unit 10. In this respect, a method for matching the second image data corresponding to the first image data received through the first receiving unit 10 among data of the server may be varied according to the format of the second image data. More specifically, in the case that the second image data has the format of the 'UDP/RTP/non TS data', the controller 100 utilizes a session description protocol (SDP), supplement enhancement information (SEI) or the like in the second image data.

In the case that the second image data has the format of 'UDP/RTP/TS data', the controller 100 utilizes a program association table (PAT) or a program map table (PMT) in the TS data of the second image data. However, the controller 100 may utilize the SDP, the SEI or the like in the second image data.

The image processing apparatus 1 may include a memory unit 90. In the memory unit 90 are stored the first image data and the auxiliary information received through the first receiving unit 10, and the second image data received through the second receiving unit 20.

The image processing unit 30 generates an image under the control of the controller 100. The image processing unit 30 generates an improved image on the basis of the first image data received through the first receiving unit 10 and the second image data received through the second receiving unit 20 under the control of the controller 100.

The image processing unit 30 may generate a first image from the first image data received through the first receiving unit 10 under the control of the controller 100. For example, in the case that the first image data is a high definition (HD) image signal, the image processing unit 30 generates the first image that is an HD image on the basis of the first image data under the control of the controller 100.

The image processing unit 30 includes a demultiplexer 40 for demultiplexing the first image data and the second image data; a synchronizer 50 for synchronizing the first image data and the second image data; and a decoder 60 for decoding the demultiplexed and synchronized first image data and the second image data.

The demultiplexer 40 divides the demodulated first image data and second image data in which the image signal and the audio signal are sequentially mixed into an image signal and an audio signal.

The synchronizer 50 synchronizes the first image data and the second image data on the basis of time information of the first image data and time information of the second image data or a timestamp value of the real time transport protocol (RTP).

In the case that the second image data has the format of the 'UDP/RTP/non TS data', the synchronizer 50 performs synchronization on the basis of the time information of the PCR, PTS or DTS of the first image data, a timestamp value in the RTP of the second image data, and a network time protocol (NTP) timestamp value in RTP control protocol (RTCP).

In the case that the second image data has the format of the 'UDP/RTP/TS data', the synchronizer 50 performs synchronization on the basis of the time information of the PCR, PTS or DTS of the first image data and the time information of the PCR, PTS or DTS of the second image data. However, the synchronizer 50 may perform synchronization using the time information of the PCR, PTS or DTS of the first image data, the timestamp value in the RTP of the second image data, and the NTP timestamp value in the RTPC.

The synchronizer 50 may synchronize the first image data and the second image data received in real time. Alternatively, the synchronizer 50 may perform synchronization in the case that the second image data of a predetermined capacity or more is received in the memory unit 90. Thus, the synchronization is smoothly performed even though the speed of the network for connecting the second receiving unit 20 and the server (S) is low. Further, the image processing unit 30 can efficiently generate an improved image.

The decoder 60 includes a video decoder 60a and an audio decoder 60b.

The video decoder 60a decodes the image signal compressed in an MPEG standard that is outputted from the demultiplexer 40 for decompression.

The audio decoder 60b performs audio processing for the audio signal outputted from the demultiplexer 40.

The image processing unit 30 may include a scaler (not shown) which performs scaling for decoded image signals having various formats that are outputted from the decoder 60a.

The controller 100 controls the second receiving unit 20 to receive the second image data from the sever (S) on the basis of the auxiliary information received through the first receiving unit 10 and controls the image processing unit 30 to generate an improved image on the basis of the first image data and the second image data.

However, the controller 100 may control the image processing unit 30 to generate the first image from the first image data according to the auxiliary information received through the first receiving unit 10.

The image processing apparatus 1 may further include a display unit 70 for displaying the image generated in the image processing unit 30. The display unit 70 may include an image display unit 70a for outputting the first image or the improved image generated in the video decoder 60a; and a speaker 70b for outputting the audio generated in the audio decoder 60b. The image display unit 70a may include a CRT, LCD, OLED, PDP or projector. The image display unit 70a provides a function for displaying a two dimensional image and a three dimensional image having 1920*1080p resolution or more according to the type of the improved image.

The image processing apparatus 1 may further include a user selection unit 80 for selecting the image of the first image data and the improved image. The user selection unit 80 may be provided with a remote controller or an outside button of the display unit 70. The controller 100 may display a user selection screen on the display unit 70 as an OSD (on screen display) for selection of the first image of the first image data and the improved image generated on the basis of the first image data and the second image data, and thus the user can select the first image or the improved image through the user selection unit 80. Accordingly, the user can selectively display the image of the first image data, and the improved image generated on the basis of the first image data and the second image data.

Figure 3:
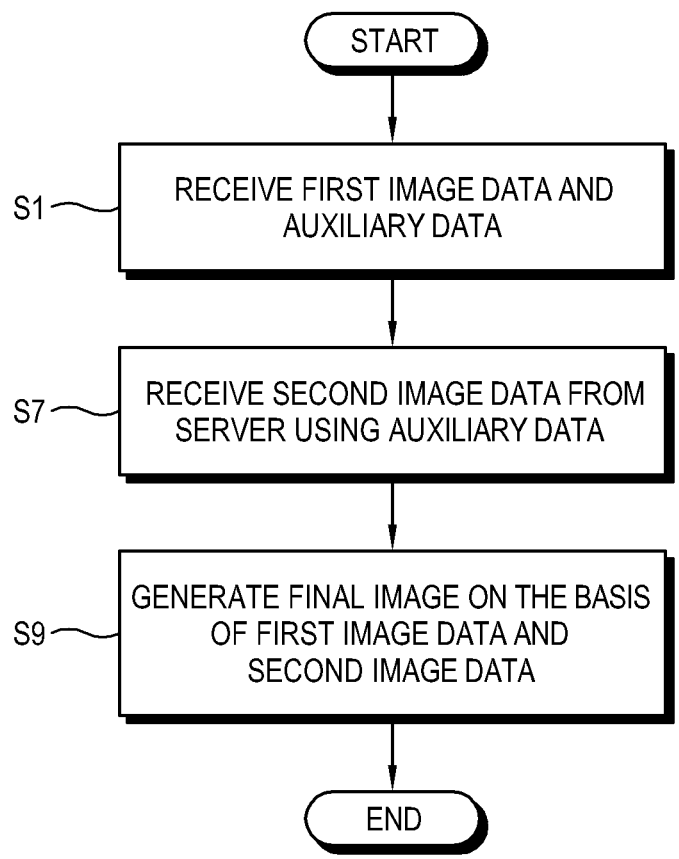
FIG. 3 is a flowchart illustrating a control method of an image processing apparatus according to an exemplary embodiment of the present invention.
Figure 4:
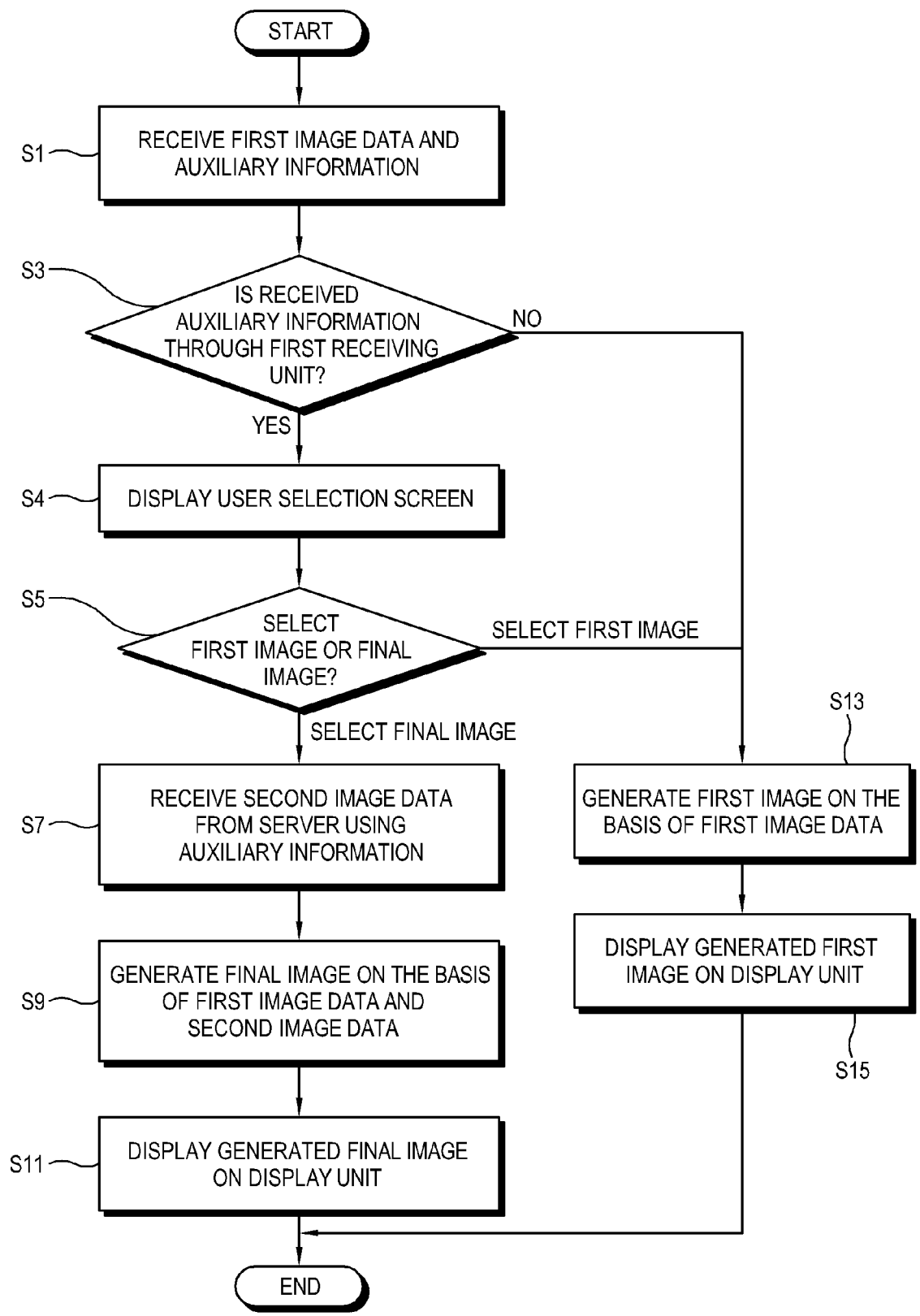
FIG. 4 is a flowchart illustrating a control method of an image processing apparatus according to another exemplary embodiment of the present invention.

Hereinafter, exemplary embodiments of a control method of the image processing apparatus 1 having the described configuration will be described referring to FIGS. 3 and 4, in which FIG. 3 is a flowchart illustrating an exemplary embodiment of a control method of the image processing apparatus 1; and FIG. 4 is a flowchart illustrating another exemplary embodiment of a control method of the image processing apparatus 1.

Firstly, the first receiving unit 10 receives the first image data and the auxiliary information for receiving the second image data (S1).

Then, it is determined whether the auxiliary information is received through the first receiving unit 10 (S3). If it is determined that the auxiliary information is received through the first receiving unit 10, the controller 100 displays a user selection screen (S4).

Then, a user determines whether to display the first image by the first image data or to display the improved image formed by the first image data and the second image data through the user selection unit 80 (S5).

If the user selects the improved image in operation S5, the controller 100 controls the second receiving unit 20 to receive the second image data from the server (S) on the basis of the auxiliary information (S7).

Then, the controller 100 controls the image processing unit 30 to generate the improved image on the basis of the first image data and the second image data (S9).

The controller 100 displays the improved image generated in the image processing unit 30 through the display unit 70 (S11).

If it is determined that the auxiliary information is not received through the first receiving unit 10 in operation S3, the controller 100 controls the image processing unit 30 to generate the first image from the first image data (S13).

Then, the controller 100 displays the first image generated in the image processing unit 30 through the display unit 70 (S15).

If the user selects the first image in operation S5, the procedure goes to operation S13.

In the above process, although operations S13 and S15 may be exchanged in sequence, the image displayed through the display unit 70 is the same.

As described above, according to exemplary embodiments of the present invention, the first receiving unit 10 receives the first image data and the auxiliary formation, the second receiving unit 20 receives the second image data from the sever (S) based on auxiliary information, and the controller 100 controls the image processing unit 30 to generate an improved image based on the first and second image data, to thereby generate a two-dimensional image or a three-dimensional image having relatively high resolution using a conventional transmission system such as a DTV system, media content transmission system or the like.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image processing apparatus, comprising:
a first receiving unit which receives first image data and auxiliary information including URL information of a server of a network for use in receiving second image data from the server;
a second receiving unit which is connected to the server of the network, and receives the second image data from the server when the auxiliary information is received by the first receiving unit;
an image processing unit which generates one of a first image from the first image data and a final image on the basis of the first image data and the second image data; and
a controller which controls the second receiving unit to receive the second image data from the server on the basis of the URL information included in the auxiliary information and controls the image processing unit to generate one of the first image and the final image,
wherein the image processing unit generates the first image if the auxiliary information about the image is not received, and generates the final image if the auxiliary information is received, and
wherein the first image data is a left-eye two-dimensional image data which has a first resolution, and the second image data is a right-eye two-dimensional image data which has a second resolution; and the final image is a three-dimensional image which has a third resolution which is higher than the first resolution and equivalent to the second resolution, equivalent to the first resolution and higher than the second resolution, or higher than the first resolution and higher than the second resolution.

2. The apparatus according to claim 1, wherein the second image data comprises at least one of depth image data, disparity image data, stereo image information, and multi view image information.

3. The apparatus according to claim 1, further comprising a display unit which displays one of the first image and the final image generated by the image processing unit.

4. The apparatus according to claim 1, further comprising a user selection unit through which one of the first image and the final image are selected.

5. The apparatus according to claim 1, wherein the image processing unit comprises:
- a demultiplexer which demultiplexes the first image data and the second image data;
- a synchronizer which synchronizes the first image data and the second image data; and
- a decoder which decodes the demultiplexed and synchronized first image data and second image data.

6. The apparatus according to claim 5, wherein the synchronizer synchronizes the first image data and the second image data based on time information of the first image data, and time information of the second image data or a timestamp value of a real time transmission protocol.

7. The apparatus according to claim 6, wherein the time information comprises at least one of a program clock reference, a presentation timestamp, and a decoding timestamp.

8. An image processing method, comprising:
- receiving first image data and auxiliary information including URL information of a server of a network for use in receiving second image data from the server;
- determining whether the auxiliary information is received or not;
- receiving the second image data from the server of the network on the basis of the URL information included in the auxiliary information when the auxiliary information is received; and
- generating a first image from the first image data if the auxiliary information is not received, or generating a final image on the basis of the first image data and the second image data if the auxiliary information is received, wherein the first image data is a left-eye two-dimensional image data which has a first resolution, and the second image data is a right-eye two-dimensional image data which has a second resolution; and the final image is a three-dimensional image which has a third resolution which is higher than the first resolution and equivalent to the second resolution, equivalent to the first resolution and higher than the second resolution, or higher than the first resolution and higher than the second resolution.

9. The method according to claim 8, wherein the second image data comprises at least one of depth image data, disparity image data, stereo image information, and multi view image information.

10. The method according to claim 8, further comprising displaying one of the generated first image and the final image.

11. The method according to claim 8, further comprising selecting one of the first image and the final image.

12. The method according to claim 8, wherein the generating the final image comprises:
- demultiplexing the first image data and the second image data;
- synchronizing the first image data and the second image data; and
- decoding the demultiplexed and synchronized first image data and second image data.

13. The method according to claim 12, wherein the synchronizing comprises synchronizing the first image data and the second image data based on time information of the first image data, and time information of the second image data or a timestamp value of a real time transmission protocol.

14. The method according to claim 13, wherein the time information comprises at least one of a program clock reference, a presentation timestamp, and a decoding timestamp.

* * * * *